Figure 1:
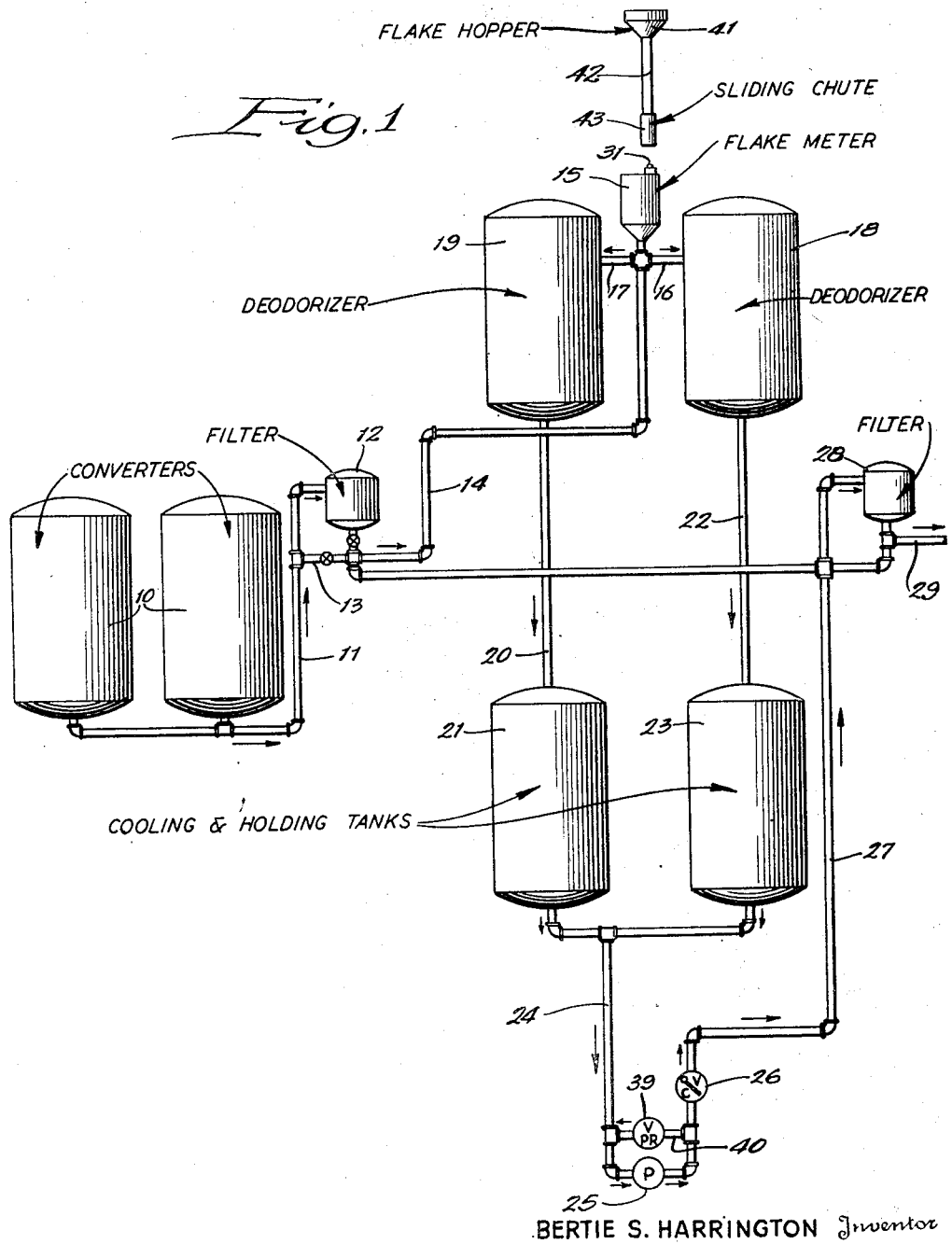

March 27, 1951 — B. S. HARRINGTON — 2,546,502
MEANS FOR INCORPORATING SOLID FAT IN LIQUID FATTY MIXTURES
Original Filed Sept. 18, 1942 — 2 Sheets-Sheet 1

BERTIE S. HARRINGTON, Inventor
By Carl C. Batz, Attorney

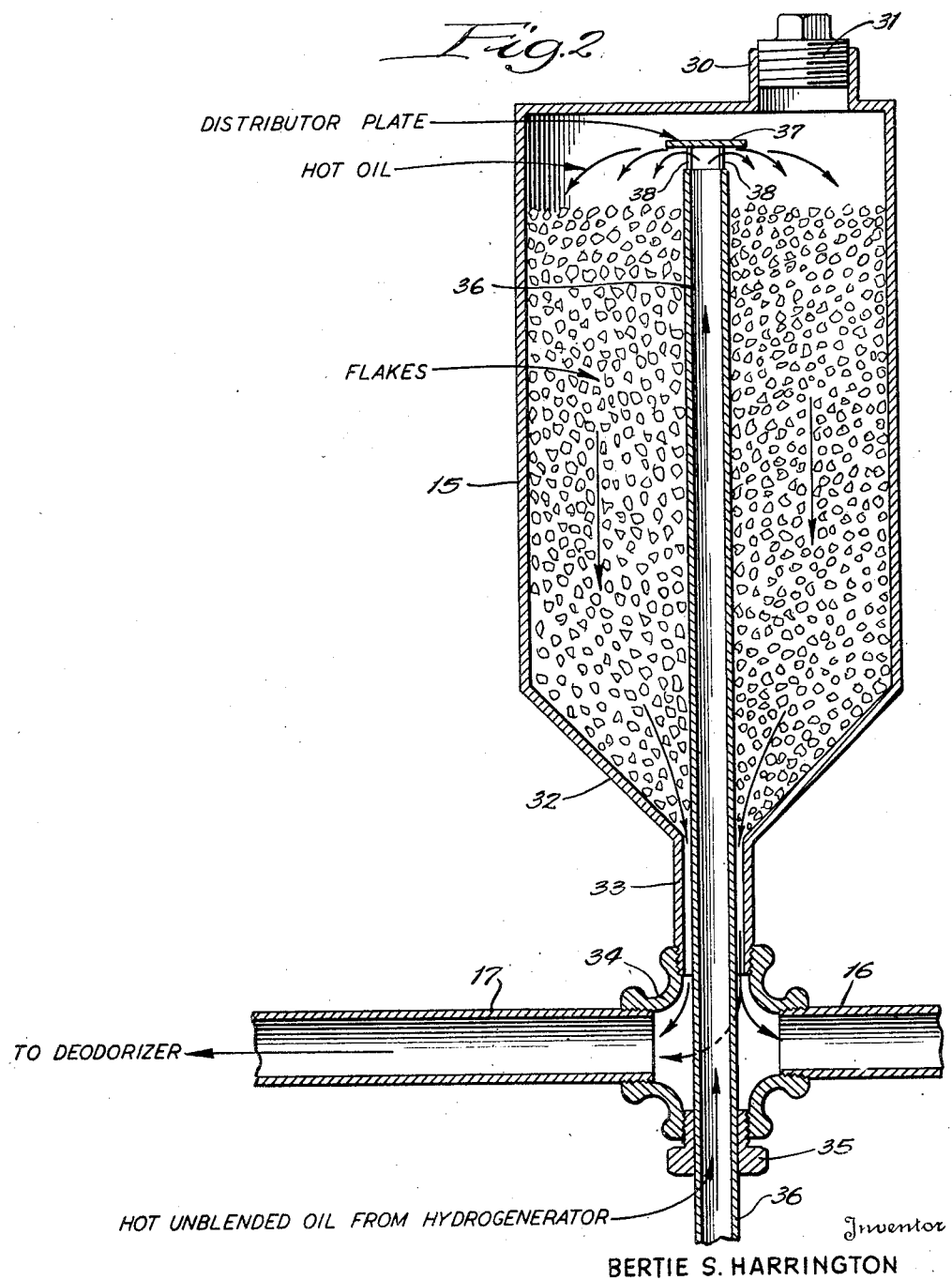

Patented Mar. 27, 1951

2,546,502

UNITED STATES PATENT OFFICE 2,546,502

MEANS FOR INCORPORATING SOLID FAT IN LIQUID FATTY MIXTURES

Bertie S. Harrington, Chicago, Ill., assignor to Armour and Company, Chicago, Ill., a corporation of Illinois Original application September 18, 1942, Serial No. 458,910. Divided and this application June 6, 1946, Serial No. 674,675

2 Claims. (Cl. 23—267)

This invention relates to means for incorporating solid fat in liquid fatty mixtures and deals particularly with methods and means for accomplishing this purpose in a continuous manner.

In the usual blending operation where fats are heated and solid fat melted to blend with liquid fats, it is found that undesirable oxidized or discolored portions are formed which adversely affect the quality of the product.

An object of the present invention is to provide means and methods whereby the solid fat can be economically melted and blended without an accompanying discoloration or contamination of the product. A further object is to provide means whereby solid fat is quickly changed to a liquid fat under conditions in which the heat employed does not adversely affect the product. Yet another object is to provide a method whereby the heat developed in the exothermic reaction of hydrogenation is utilized in an atmosphere of hydrogen for bringing about the melting of solid fat without discoloration and without the production of undesirable oxidized products.

Also, in systems which are operated in a continuous manner and where the liquid fat flows continuously from one step to another, there has been no successful way of introducing solid fat into the liquid. It is an important object of my invention to provide methods and apparatus by which this can be done. More specifically, an object is to provide such methods and means as will avoid objectionable congealing of the blended material so that it will move freely and continuously in the system.

The improved process can be carried on in varied forms of apparatus. Advantageously I can use the apparatus shown in the accompanying drawings, in which—

Figure 1 is a diagrammatic view showing apparatus embodying my invention and in which the process hereof may be carried out; and Fig. 2, an enlarged vertical sectional view of the melting drum employed.

In the apparatus shown in Fig. 1, converters 10 are shown, from which the hydrogenated oil may be led through line 11 to a filter 12. A valved by-pass line 13 may be used in the event it is desired not to pass the oil through the filter 12. Through line 14, the hydrogenated oil passes upwardly and into a blending drum or tank 15 containing solid fat. From the lower portion of the drum 15, melted fat and oil are passed through lines 16 and 17 into deodorizers 18 and 19. From the deodorizer 19, the oil passes through line 20 into the cooler 21, and from deodorizer 18 the oil passes through line 22 into cooler 23. The combined oil from the coolers passes downwardly through line 24 and is forced by means of pump 25 upwardly through the check valve 26 and pipe 27 to a filter 28, from which the removable catalyst or any remaining portion thereof is removed. From the filter, the finished oil is drawn away through line 29 to any desired point.

The hydrogenation converters 10 are supplied with the usual means for introducing hydrogen under pressure and means for supplying heating and cooling fluids about the reaction chamber. The heated oil combined with a removable catalyst, such as a nickel catalyst, is introduced in the usual way therein.

The filter 12 is of the continuous closed type and its structure is well known. Any suitable type of filter for the removal of the catalyst may be employed. If desired, the filter 12 may be omitted, and all of the catalyst may be removed in the final filter 28.

In the illustration given, the blending drum 15 is provided at its top with an opening having a flared threaded tube portion 30 extending above the opening. The threaded portion 30 receives a closure plug 31 forming an airtight seal for the top of the tank. It is understood that any suitable closure means for effecting an airtight closure may be employed. The lower portion of the tank or drum 15 has inwardly-extending conical walls 32, terminating in a neck 33 of substantially uniform diameter. The lower portion of the neck 33 is threaded externally and is received within a fitting 34. The lower opening of the fitting 34 threadedly engages a packing nut 35 through which extends the feed pipe 36. The feed pipe 36 extends upwardly through the fitting 34, the neck 33, and almost to the top of the drum 15. The pipe 36 is preferably provided with a distributor plate 37 supported by spaced pins 38 a short distance above the end pipe 36 and serving to deflect oil evenly about the interior of drum 15.

The fitting 34 is provided with two laterally-extending drain pipes 17 and 16, the pipe 17 leading to the deodorizer 19, and the pipe 16 leading to the deodorizer 18.

The deodorizers 18 and 19 need not be described in detail since these structures are well known in the art. As usual, the deodorizers are provided with means (not shown) for producing vacuum, and also, if desired, with pipes for circulating a heating fluid therein. Deodorizers, as well as hydrogenation converters, are illustrated in detail in the co-pending applications of Ralph H. Potts and Charles E. Morris, Serial No. 425,284, now abandoned, and Serial No. 427,290, now abandoned, both applications being entitled "Treating Edible Oils." Cooling tanks, as indicated by the numerals 21 and 23, are also shown in detail in the above applications.

If desired, a pressure release value 39 may be placed within a by-pass line 40 extending between the lines 24 and 27.

Any suitable means for introducing the solid fat in flaked or other comminuted form may be employed. In the illustration given in Fig. 1, the flaked fat passes from the hopper 41 through a pipe 42 and from thence through a sliding chute 43 which, when lowered, fits about the collar 30 of drum 15. With the closure 31 removed, flaked fat is admitted to fill the container, and then the chute is raised to the elevated position shown in Fig. 1 in which it is latched.

Operation

In the operation of the process, a suitable solid fat product is fed into drum 15 to fill the same to about the level indicated in Fig. 2. In the filling operation, the plug 31 is removed, the chute 43 is dropped to a position about the neck 30 and then flaked fat is passed from the hopper 41 downwardly and into the drum 15. After filling, the chute 43 is raised and latched in raised position. The closure 31 is then secured into position so as to form an airtight closure. The evacuating apparatus connected to the deodorizers 18 and 19 then eliminates air from the deodorizers and, by means of the pipe connections 16 and 17, the air within the drum 15.

The mixed catalyst and oil, together with the introduced hydrogen, are brought into the hydrogenators 10 and the hydrogenation step carried on in the usual manner, the temperature of oil being raised to a considerable extent by the exothermic reaction. The heated oil from the converters is then passed through line 11, either through the filter 12 for the removal of the catalyst or through the by-pass line 13. The heated oil then passes through line 14 and into the pipe 36, forming a continuation thereof which extends into the drum 15. The hot oil is deflected by plate 37 so as to be distributed upon the flaked fat. At the same time, the drum 15 is filled with an atmosphere of hydrogen carried along as excess by the heated oil. Under the vacuum employed and under the influence of the hydrogen atmosphere, the flakes melt readily without forming discolored products, and the blended oil passes downwardly in liquid form through neck 33 and from thence through lines 16 and 17 into the deodorizers. In passing downwardly through neck 33, the blended oil comes in contact with the tube 36 which encloses the stream of hot oil rising into the blending chamber. Thus the blended material is brought into heat transfer relation with this hot oil and is so maintained at a temperature well above the point at which it will congeal. In this way the blended material is maintained in liquid condition until it is withdrawn from the blending chamber and is on its way to the deodorizers, and all clogging at the chamber exit is prevented.

In the deodorizers, the undesired volatile products are withdrawn from the blended oil, and the finished product passes downwardly through lines 20 and 22 into the cooling tanks 21 and 23. The cooled oil then is drawn from pipe 24 and forced by pump 25 through the final filter 28, from which the catalyst or any remaining traces thereof are removed. The refined product is withdrawn through pipe 29 to a suitable point of recovery.

Temperature and pressure conditions in the various parts of the apparatus may vary considerably. In a hydrogenator, the pressure may vary from 20 to 75 pounds, at which pressure free hydrogen goes into solution in the oil and remains dissolved therein. The degree of vacuum employed in the deodorizers is merely that necessary for the removal of the undesirable volatile fractions.

As a specific illustrative operation, a batch of cottonseed oil fatty acids is mixed with a nickel catalyst and then pumped into the hydrogenators. In the converters, the temperature is raised to about 300° F. by means of circulating a hot fluid through heating coils, and hydrogen is pumped into the bottom of the tank under pressure. If desired, the product may be mixed by an agitator. As the temperature increases by reason of the exothermic reaction, a cooling fluid may be employed to prevent excessive temperatures. The oil is withdrawn at a high temperature to the flake melter or blending drum 15. Passing upwardly through the central pipe 36 the hot oil gives up some of its heat to the downwardly flowing material in neck 33 so as to maintain this in liquid form, and then is distributed at the top of pipe 36 onto the larger body of unblended fat. The blended fat from drum 15 passes to the deodorizers 18 and 19 under a vacuum of about 20½ inches of mercury. If desired, additional heat may be supplied in the deodorizers. The oil from the deodorizers passes through the coolers and finally through the filter 28, as already described.

It will be noted that in the foregoing operation, the heat generated by the exothermic reaction, together with the hydrogen in the oil, is utilized in the flake melter 15 for melting the flakes without any adverse change therein, air being excluded by the presence of the hydrogen and by the vacuum drawn by means of the connections with the deodorizers.

In the foregoing operation, it is found that the blended oil has much better color than heretofore produced and a much improved flavor. The treatment of the oil in the blending drum without exposure to the air undoubtedly improves the color of the oil. The improved flavor may be due to the fact that the impurities in the oil are more easily removed if kept in the reduced condition (i. e., an organic impurity would be reduced by the hydrogenation and, in this condition, would have a higher vapor pressure and, therefore, is more volatile than it would be after being given a chance to oxidize upon exposure to air). Whatever be the explanation, it is clear that the treating of the flaked fat in the presence of hydrogen and in the absence of air, results in a blended product of a much improved color, flavor, and stability.

A very substantial advantage lies in the way the blending operation is conducted since the blended fat is passed in heat transfer relation with the incoming hot liquid fat so that there is no solidification at the outlet of the drum and consequently no clogging at this point. Were it not for this feature, the hot oil would give up its heat as it contacts and melts a portion of the solid fat and then when it reaches the exit the blended fat would congeal and clog the outlet. The conical bottom of the drum and the relatively narrow bottom neck contributes toward the heat transfer relation just described.

The process is extremely simple and economical while resulting in a better product than has heretofore been obtained with substantially no increase in expense. The apparatus is compact, simple, and highly effective for accomplishing the new functions.

Although the method and apparatus herein described for blending fats is particularly useful in connection with the system for continuously hydrogenating fats, it is also useful in other connections, and there is no intention to limit the invention to the particular system described. The improved blending method and apparatus also contributes its advantages in the prevention of congealment of the blended fat, whether or not the air is excluded therefrom or a vacuum employed.

It is understood that many changes may be made in the manner of carrying out the invention from that specifically described herein, and nothing contained in this detailed description is intended to take from the scope of the appended claims.

This application is a division of my co-pending application Serial No. 458,910, filed September 18, 1942, which matured into Patent No. 2,446,178.

I claim:

1. An apparatus for preparing a blended and deodorized product of fat and hydrogenated oil, which comprises a hydrogenating tank, a deodorizing tank, and a blending tank positioned therebetween, said blending tank comprising a tapering lower portion, a neck portion below said tapering portion, and an upper portion, an inlet conduit extending concentrically with said neck portion upwardly into said upper portion so as to provide an inlet passage for hydrogenated oil and to provide an annular outlet passage for the blended liquid product between said conduit and the wall of said neck portion, the tapered bottom of said blending tank opening at its lower end into said annular outlet passage at a point adjacent said inlet conduit, said neck portion being connected to a second conduit extending so as to provide a passage through said annular outlet passage to said deodorizing tank, the upper portion of said blending tank including a top, a closable opening for the reception of solid fat, and a deflector baffle located over the open end of said upwardly extending inlet conduit, said hydrogenating tank, deodorizing tank, blending tank, and connecting conduits being sealed to prevent contact of air with the interior thereof.

2. An apparatus for preparing a blended and deodorized product of fat and hydrogenated oil, which comprises a hydrogenating tank, a deodorizing tank, and a blending tank positioned therebetween, said blending tank comprising a tapering lower portion, a neck portion below said tapering portion, and an upper portion, an inlet conduit extending concentrically with said neck portion upwardly into said upper portion so as to provide an inlet passage for hydrogenated oil and to provide an annular outlet passage for the blended liquid product between said conduit and the wall of said neck portion, the tapered bottom of said blending tank communicating with said annular outlet passage by means of an opening in the portion of the tank closest to said inlet conduit, said neck portion being connected to a second conduit extending so as to provide a passage through said annular outlet passage to said deodorizing tank, the upper portion of said blending tank including a top, a closable opening for the reception of solid fat, and a deflector baffle located over the open end of said upwardly extending inlet conduit, said hydrogenating tank, deodorizing tank, blending tank, and connecting conduits being sealed to prevent contact of air with the interior thereof.

BERTIE S. HARRINGTON.

REFERENCES CITED

The following references are of record in the file of this patent:

UNITED STATES PATENTS

| Number | Name | Date |
|---|---|---|
| 478,157 | Eastman | July 5, 1892 |
| 940,612 | Paterson | Nov. 16, 1909 |
| 1,081,730 | Fiske | Dec. 16, 1913 |
| 2,063,131 | Siems | Dec. 8, 1936 |

FOREIGN PATENTS

| Number | Country | Date |
|---|---|---|
| 344,314 | Germany | Nov. 19, 1921 |